US012106915B2

(12) United States Patent
Shuang et al.

(10) Patent No.: US 12,106,915 B2
(45) Date of Patent: Oct. 1, 2024

(54) CONTROL CIRCUIT FOR CONTACTOR AND ITS CONTROL METHOD

(71) Applicant: SCHNEIDER ELECTRIC INDUSTRIES SAS, Rueil Malmaison (FR)

(72) Inventors: Bing Shuang, Shanghai (CN); David Lanes, Rueil Malmaison (FR); Vincent Geffroy, Shanghai (CN)

(73) Assignee: Schneider Electric Industries SAS, Rueil Malmaison (FR)

( * ) Notice: Subject to any disclaimer, the term of this patent is extended or adjusted under 35 U.S.C. 154(b) by 161 days.

(21) Appl. No.: 17/789,091

(22) PCT Filed: Dec. 25, 2020

(86) PCT No.: PCT/CN2020/139489
§ 371 (c)(1),
(2) Date: Jun. 24, 2022

(87) PCT Pub. No.: WO2021/129814
PCT Pub. Date: Jul. 1, 2021

(65) Prior Publication Data

US 2023/0040913 A1 Feb. 9, 2023

(30) Foreign Application Priority Data

Dec. 26, 2019 (CN) ......................... 201911370027.9

(51) Int. Cl.
*H01H 47/00* (2006.01)
*H01H 47/22* (2006.01)

(52) U.S. Cl.
CPC .......... *H01H 47/005* (2013.01); *H01H 47/22* (2013.01)

(58) Field of Classification Search
CPC ............................. H01H 47/005; H01H 47/22
(Continued)

(56) References Cited

U.S. PATENT DOCUMENTS 5,153,498 A * 10/1992 Parro ........................ H02P 9/42 322/32
5,374,881 A * 12/1994 Post ........................ B60L 15/20 318/380
2002/0141209 A1* 10/2002 Bridge .............. H02M 3/33592 363/89

FOREIGN PATENT DOCUMENTS

CN 201584367 U 9/2010
CN 105321770 A 2/2016
(Continued)

OTHER PUBLICATIONS

International Search Report mailed Mar. 24, 2021 for International Patent Application No. PCT/CN2020/139489, 8 pages.

*Primary Examiner* — Yemane Mehari
(74) *Attorney, Agent, or Firm* — Locke Lord LLP

(57) ABSTRACT

Embodiments of the present disclosure relate to a control circuit for a contactor and a control method thereof. The control circuit comprises: a pulse converter configured to convert a turn-on control signal into a continuous pulse signal; a first controller configured to generate a first breaking control signal at a first time in response to detection of the disappearance of the continuous pulse signal received from the pulse converter; a second controller configured to generate a second breaking control signal at a second time in response to detection of the disappearance of the continuous pulse signal received from the pulse converter, wherein the first time is earlier than the second time; and a coil driver configured to turn off a current of the excitation coil according to the received first breaking control signal, and if the current is not turned off according to the first breaking control signal, to further turn off the current of the excitation coil according to the second breaking control signal, thereby realizing the breaking of the main contact.

26 Claims, 4 Drawing Sheets

(58) Field of Classification Search
USPC .............................................................. 361/16
See application file for complete search history.

(56) References Cited

FOREIGN PATENT DOCUMENTS

| | | | |
|---|---|---|---|
| CN | 105977099 | A | 9/2016 |
| CN | 108281324 | A | 7/2018 |
| CN | 110491733 | A | 11/2019 |
| JP | 2015153556 | A | 8/2015 |

* cited by examiner

CONTROL CIRCUIT FOR CONTACTOR AND ITS CONTROL METHOD

FIELD

Embodiments of the present disclosure relate to a contactor, and more specifically to a control circuit for a contactor and a control method thereof.

BACKGROUND

A contactor is an electrical device that achieves the control of a load by allowing a current to flow through a coil to generate a magnetic field to close a contact. A working principle of the contactor is: when the coil of the contactor is energized, the current in the coil will generate the magnetic field which causes a static iron core to generate an electromagnetic attraction force which attracts the iron core, thereby achieving the closure of a main contact of the contactor; when the coil is powered off, the electromagnetic attraction force disappears, and an armature is released under the action of a release spring so that the main contact is opened.

The safe stop of the contactor is an important function for the contactor in controlling the load and is used to ensure that the load can be stopped safely in an emergency. For the safe stop function of the contactor, a functional authentication is usually needs to be performed.

There are two common control manners for the safety stop function of common contactors: one is direct control of the power supply, namely, the power supply to the coil is directly cut off to stop the load. This control manner is advantageous in simplicity and directness, but it is usually only directly adapted for the contactor with a smaller current in the coil. If this manner is employed for a contactor with a large current in the coil, an additional relay needs to be used to cut off, which undoubtedly increases the use cost. The other control manner is digital input control. In this manner, the load is stopped according to a digital input signal of 24 VDC or 48 VDC from a programmable logic controller (PLC), and this control manner is advantageous in that the magnitude of the current in the coil is not limited, the manner may be adapted for contactors with all current levels, and the cost is lower. As for this control manner, to implement digital input control, the contactor needs to monitor the digital input control signal via software embedded in a microcontroller, to decide whether to open or close the main contact of the contactor. However, on the one hand, such software needs to be authenticated, which makes the update or maintenance of the software become troublesome; on the other hand, since the digital signal is monitored and the breaking and closing of the contactor is achieved only depending on the software, when the software itself fails, the safe stop of the contactor is hard to achieve so that higher safety guaranty cannot be provided.

SUMMARY

One of the objects of the present disclosure is to provide an improved control circuit of a contactor and a control method thereof, which can at least improve the safety stop function of the contactor, thereby providing higher safety guarantee.

According to a first aspect of the present disclosure, there is provided a control circuit for a contactor. The contactor comprises an excitation coil and a main contact coupled to the excitation coil, the control circuit comprising: a pulse converter configured to convert a received turn-on control signal indicating to turn on the contactor into a continuous pulse signal; a first controller connected to the pulse converter and configured to generate a first breaking control signal at a first time in response to detection of the disappearance of the continuous pulse signal received from the pulse converter; a second controller connected to the pulse converter and in parallel with the first controller, the second controller being configured to generate a second breaking control signal at a second time in response to detection of the disappearance of the continuous pulse signal received from the pulse converter, wherein the first time is earlier than the second time; and a coil driver connected to the first controller, the second controller and the excitation coil, and configured to turn off a current of the excitation coil according to the received first breaking control signal, and if the current is not turned off according to the first breaking control signal (332), to further turn off the current of the excitation coil according to the second breaking control signal, thereby realizing the breaking of the main contact.

Through the above control circuit, redundant breaking control may be achieved by using the second controller in addition to the first controller, thereby ensuring that even in the event of a failure of the first controller, safe braking of the contactor may also be achieved, thereby providing higher safety guarantee.

In some embodiments, the first controller may comprise a microcontroller that provides the first breaking control signal to the coil driver through software embedded therein; the second controller may comprise a hardware control circuit which provides the second breaking control signal to the coil driver through a physical electrical element. In these embodiments, with the hardware control circuit being provided to achieve the second controller, it is possible to avoid failure to break the contactor after the software in the microcontroller fails, and the dilemma that the software needs to be re-authenticated in the case that software is updated or changed.

In some embodiments, the first controller is further configured to generate a first turn-on control signal for the coil driver at a third time in response to detection of the input of the continuous pulse signal, and the second controller is further configured to generate a second turn-on control signal for the coil driver at a fourth time in response to detection of the input of the continuous pulse signal, wherein the second turn-on control signal is an enable signal for the coil driver, and the third time is later than the fourth time; the coil driver is further configured to be allowed to implement current control of the excitation coil via the first turn-on control signal only in the case that the coil driver is enabled by the second turn-on control signal. In these embodiments, being enabled by the second turn-on control signal, the coil driver will enter an enable mode. Only in the enable mode can the coil driver accept the control of the signal output by the first controller.

In some embodiments, the hardware control circuit comprises: a switch driver configured to receive the continuous pulse signal and convert the continuous pulse signal into a switch control signal; and a switch circuit connected to the switch driver and the coil driver, and configured to generate the second breaking control signal or a second turn-on control signal based on the switch control signal. In these embodiments, implementing the above hardware control circuit by the way of the switch drive circuit may make the structure of the hardware control circuit become simple.

In some embodiments, the switch circuit comprises a resistor and a switch element connected in series with each other, one end of the switch element is grounded, and a node between the resistor and switch element connected in series is connected to the coil driver. In these embodiments, the switch circuit may output the second turn-on control signal serving as an enable signal and the second breaking control signal serving as the breaking signal to the coil driver in a simple manner.

In some embodiments, the hardware control circuit further comprises a filter circuit connected to the output of the switch driver. The purpose of this filter circuit is to smooth the switch control signal.

In some embodiments, the control circuit further comprises an isolation circuit disposed between the pulse converter and the in-parallel arrangement of the first controller and second controller, and configured to transmit the continuous pulse signal to both the first controller and second controller. In this embodiment, electrical isolation of the output of the pulse converter and the load end of the contactor can be achieved.

In some embodiments, the control circuit further comprises a switch control circuit for the contactor, the switch control circuit being configured to, in response to a user's switching-on operation, generate a turn-on control signal indicating to turn on the contactor, where the turn-on control signal is represented by a high level; and in response to the user's switching-off operation, stop generating any signal to the pulse converter. In these embodiments, the switching-on operation of the contactor may be indicated by generating the high level signal.

In some embodiments, the pulse converter stops outputting the continuous pulse signal in the case that the switch control circuit stops generating any signal to the pulse converter. In these embodiments, the pulse converter only generates a low level signal alternated with the continuous pulse signal.

According to a second aspect of the present disclosure, there is provided a contactor. The contactor comprises the control circuit according to the first aspect.

According to a third aspect of the present disclosure, there is provided a control method for a contactor, wherein the contactor comprises an excitation coil and a main contact coupled to the excitation coil. The control method comprises: receiving, by a pulse converter, a control signal indicating to turn on or off the contactor, and converting the turn-on control signal indicating to turn on the contactor into a continuous pulse signal; in response to detection of the disappearance of the continuous pulse signal, generating, by a first controller, a first breaking control signal for a coil driver at a first time, wherein the coil driver is configured to drive the excitation coil; in response to detection of the disappearance of the continuous pulse signal, generating, by a second controller, a second breaking control signal at a second time, where the first time is earlier than the second time; turning off, by the coil driver, a current in the excitation coil according to the received first breaking control signal, and if the current is not turned off according to the first breaking control signal, further turning off, by the coil driver, the current of the excitation coil according to the second breaking control signal, thereby achieving the breaking of the main contact.

The same technical effect as the control circuit described in the first aspect above may be achieved through the control method of the present disclosure.

In some embodiments, the first controller comprises a microcontroller that provides the first breaking control signal to the coil driver through software embedded therein; The second controller comprises a hardware control circuit that provides the second breaking control signal to the coil driver through a physical electrical element.

In some embodiments, the control method further comprises: outputting, by the first controller, a first turn-on control signal for the coil driver at a third time in response to detection of the input of the continuous pulse signal, and outputting, by the second controller, a second turn-on control signal for the coil driver at a fourth time in response to detection of the input of the continuous pulse signal, where the second turn-on control signal is an enable signal for the coil driver, and the third time is later than the fourth time; and implementing current control of the excitation coil via the first turn-on control signal in the case that the coil driver is enabled by the second turn-on control signal.

In some embodiments, the hardware control circuit comprises a switch driver and the switch circuit, wherein generating the second breaking control signal comprises: converting the continuous pulse signal into a switch control signal via a switch driver; and generating the second breaking control signal via the switch circuit based on the switch control signal.

In some embodiments, the method further comprises transmitting the continuous pulsed signal to both the first controller and the second controller via an isolation circuit.

In some embodiments, the method further comprises: in response to a user's switching-on operation, generating the turn-on control signal indicating to turn on the contactor and outputting the turn-on control signal to the pulse converter, where the turn-on control signal is represented by a high level, and in response to the user's switching-off operation, stopping the output of the signal to the pulse converter.

According to a fourth aspect of the present disclosure, there is provided a control circuit for a contactor, wherein the contactor comprises an excitation coil and a main contact coupled to the excitation coil. The control circuit comprises: a pulse converter configured to convert a received turn-on control signal indicating to turn on the contactor into a continuous pulse signal; a controller connected to the pulse converter and configured to generate a breaking control signal in response to detection of the disappearance of the continuous pulse signal received from the pulse converter; and a coil driver connected to the controller and the excitation coil, and configured to turn off a current of the excitation coil according to the received breaking control signal, thereby achieving the breaking of the main contact.

The control circuit in the fourth aspect provides a possibility to achieve the breaking control of the contactor with only a single controller. In particular, in some embodiments, the single controller may be a hardware control circuit that provides the breaking control signal to the coil driver through a physical electrical element. In yet other embodiments, the single controller may be a microcontroller that provides the breaking control signal to the coil driver through software embedded therein.

In some embodiments, the hardware control circuit comprises: a switch driver configured to receive the continuous pulse signal and convert the continuous pulse signal into a switch control signal; and a switch circuit connected to the switch driver and the coil driver, and configured to generate the second breaking control signal or the second turn-on control signal based on the switch control signal.

In some embodiments, the switch circuit comprises a resistor and a switch element connected in series with each other, one end of the switch element is grounded, and a node between the resistor and switch element connected in series is connected to the coil driver.

In some embodiments, the hardware control circuit further comprises a filter circuit connected to the output of the switch driver.

In some embodiments, the controller is further configured to generate a turn-on control signal for the coil driver in response to detection of the input of the continuous pulse signal; the coil driver is further configured to receive the turn-on control signal, and implement current control of the excitation coil according to the turn-on control signal.

In some embodiments, the control circuit further comprises an isolation circuit which is disposed between the pulse converter and the controller to isolate the output of the pulse converter from a load end of the contactor, and is configured to transmit the continuous pulse signal to the controller.

In some embodiments, the control circuit further comprises a switch control circuit for the contactor, the switch control circuit being configured to, in response to a user's switching-on operation, generate a turn-on control signal indicating to turn on the contactor, where the turn-on control signal is represented by a high level; and in response to the user's switching-off operation, stop generating any signal to the pulse converter.

In some embodiments, the pulse converter stops outputting the continuous pulse signal in the case that the switch control circuit stops generating any signal to the pulse converter.

It should be appreciated that this Summary is not intended to identify key features or essential features of embodiments of the present disclosure, nor is it intended to be used to limit the scope of the present disclosure. Other features of embodiments of the present disclosure will become apparent through the following depictions.

BRIEF DESCRIPTION OF THE DRAWINGS

Through the following detailed description with reference to the accompanying drawings, the above and other features, advantages and aspects of embodiments of the present disclosure will become more apparent. In the figures, the same or like reference numbers denote the same or like elements, wherein.

DETAILED DESCRIPTION OF EMBODIMENTS

Embodiments of the present disclosure will be described in more detail below with reference to the figures. While certain embodiments of the present disclosure are shown in the figures, it should be appreciated that the present disclosure may be implemented in various forms and should not be construed as being limited to the embodiments set forth herein, and instead, these embodiments are provided to enable more thorough and complete understanding of the present disclosure. It should be appreciated that the figures and embodiments of the present disclosure are only for exemplary purposes, and are not intended to limit the protection scope of the present disclosure.

Embodiments of the present disclosure provide a control circuit for a contactor, which is conceived in a way that in addition to outputting a first breaking control signal to a coil driver that drives a coil of the driver through a first controller (e.g., a microcontroller), a second controller (for example, a hardware controller) is additionally added to output a second breaking control signal to the same coil driver in a hysteretic manner, wherein the coil driver is preferably opened by the first breaking control signal, and it is further opened according to the second breaking control signal if it fails to be opened according to the first breaking control signal. Therefore, with both the first controller and second controller, redundant breaking control may be provided, thereby increasing the safety level of the contactor. In particular, the first controller may be a microcontroller, which may provide the coil driver with the first breaking control signal through software embedded therein; the second controller may be a hardware control circuit including for example a switch drive circuit, i.e., the controller provides a redundant second breaking control signal to the coil driver through a physical electrical element. With the hardware control circuit being provided, it is possible to avoid failure to open the contactor after the software in the microcontroller fails, and the dilemma that the software needs to be re-authenticated in the case that software is updated or changed.

The principle of a control circuit of a contactor of the present disclosure will be described below first with reference to FIG. 1.

Figure 1:
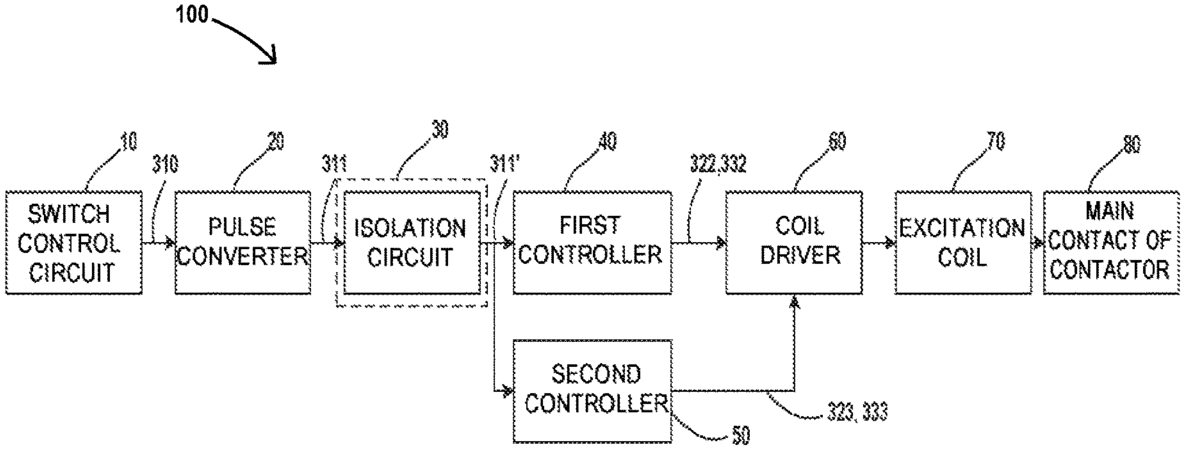
FIG. 1 shows a schematic diagram of the principle of a control circuit of a contactor according to the present disclosure.

As shown in FIG. 1, the control circuit 100 mainly comprises a pulse converter 20, a first controller 40, a second controller 50 and a coil driver 60, and the contactor mainly comprises an excitation coil 70 and a main contact 80 coupled to the excitation coil.

Generally speaking, as for a switching-on operation to turn on the contactor instructed by e.g., a user, a switch control circuit 10 associated with the contactor will generate a turn-on control signal (e.g., a constant DC voltage such as 24 VDC or 48 VDC) to indicate that the contactor is to be turned on. At this time, the excitation coil 70 is driven to generate the current to cause a static iron core to generate an electromagnetic attraction force to attract the iron core, thereby closing the main contact 80 of the contactor.

As for a switching-off operation to open the contactor instructed by e.g., a user, the turn-on control signal (for example, a constant DC voltage such as 24 VDC or 48 VDC) output by the switch control circuit 10 will be cut off, whereby no level signal is input to the following pulse converter 20 (or stop outputting the above-mentioned turn-on control signal to the pulse converter 20). In this case, the current in the excitation coil 70 and the electric field generated by it are cut off, so that the static iron core loses the electromagnetic attraction force, and then the main contact 80 of the contactor is opened under the action of the return of the release spring.

In practice, it may be disadvantageous to directly input a constant high level turn-on control signal into for example the first controller to achieve the control of the contactor because in the event of a failure of for example an intermediate device (such as an isolator), although the turn-on control signal output by the switch control circuit 10 is already cut off, the control signal input to the controller might still be maintained at a high level, which is obviously unfavorable for a contactor that requires a higher safety breaking guarantee.

In order to avoid the above-mentioned possibly unfavorable situation, the control circuit 100 of the present disclosure incorporates a pulse converter 20. The function of the pulse converter 20 is to receive the signal input from the switch control circuit 10 and convert a turn-on control signal 310 instructing to turn on the contactor into a continuous pulse signal 311. In the event of a failure of for example an intermediate device (such as an isolator), although the control signal input to the controller might still be maintained at a high level, the controller may judge whether the intermediate device fails by detecting whether the input high level signal is the continuous pulse signal. In some embodiments, the frequency of the continuous pulse signal 311 may be, for example, 1000 Hz, with a duty cycle of 25%.

In some embodiments, the control circuit 100 may also include an isolation circuit 30. The continuous pulse signal 311 output by the pulse converter 20 may thus be transmitted to the first controller 40 and the second controller 50 via the isolation circuit 30. The function of the isolation circuit 30 is to electrically isolate the output of the pulse converter 20 from a load end of the contactor, but simultaneously transmit a signal 311' substantially the same as the continuous pulse signal 311 to the first controller 40 and the second controller 50. It will be appreciated that the arrangement of the isolation circuit 30 is very important to the user's safe operation, and normal operation of the switch control circuit 10 and the pulse converter 20. However, in some specific embodiments, the isolation circuit 30 may also be omitted.

The first controller 40 and the second controller 50 are connected in parallel and are both connected to the pulse converter 20 via the optional isolation circuit 30 described above. The first controller 40 and the second controller 50 function to monitor the continuous pulse signal 311 (or 311') received from the pulse converter 20 and respectively output the control signal to the coil driver 60 of the contactor to open or close the contactor. As previously described, the arrangement of both the first controller 40 and the second controller 50 may advantageously provide redundant breaking control, thereby providing a contactor with higher safety guarantee.

In some embodiments, the first controller 40 may be a microcontroller that provides a control signal for the coil driver 60 through software embedded in the microcontroller. The second controller 50 may be a hardware control circuit, which provides the second breaking control signal 333 to the coil driver 60 through a physical electrical element. The particular advantage of the embodiment is that through the second controller of the hardware control circuit, the breaking of the contactor may be achieved in a hardware manner, which may avoid the influence of the failure of the software in the microcontroller on the breaking of the contactor, and the dilemma that the software needs to be re-authenticated in the case that software is updated or changed.

It will be appreciated that although the first controller 40 implemented as a microcontroller and the second controller 50 implemented as the hardware control circuit are described above, this is not for a limitation purpose. In in other embodiments, the first controller 40 and the second controller 50 may both be the microcontroller, or the first controller 40 and the second controller 50 may both be the hardware control circuit, or the first controller 40 may be the hardware control circuit and the second controller 50 may be the microcontroller.

In addition, although the disclosure proposes a combined control manner of both the first controller 40 and the second controller 50 above, it will also be appreciated that it is also possible to only use any one of the first controller 40 and the second controller 50 to realize the control of the contactor. In addition, it will also be appreciated that a control method of a single controller is also obvious based on the following description of various embodiments of the present disclosure.

Figure 2:
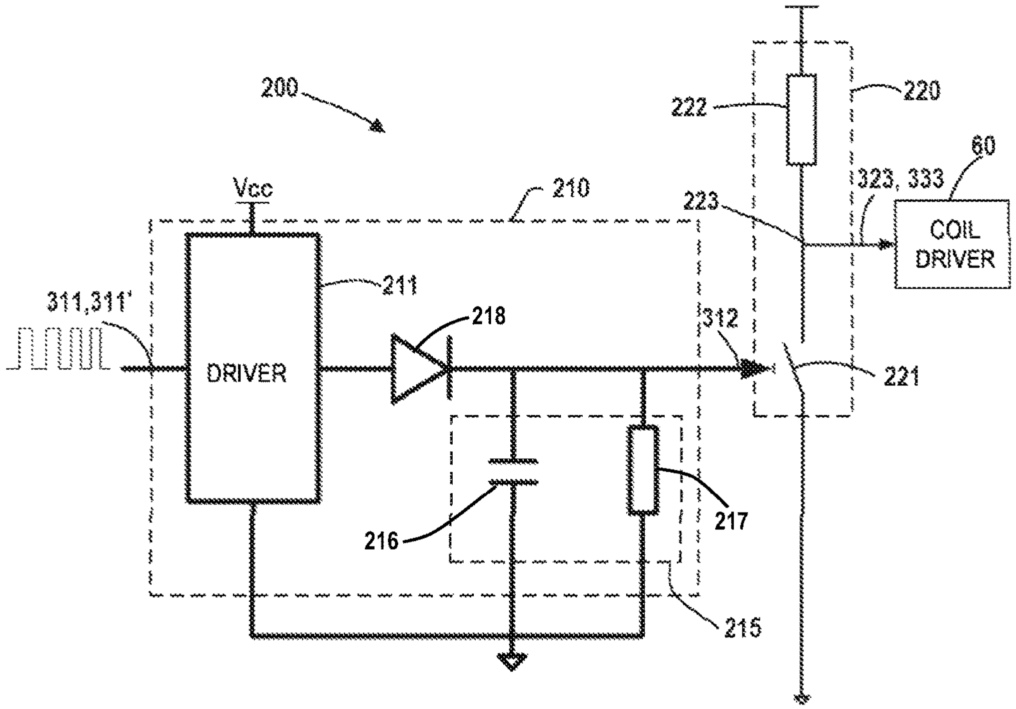
FIG. 2 shows an exemplary structural schematic diagram of a second controller in the control circuit of the contactor according to the present disclosure.

Just take the second controller 50 being implemented as a hardware control circuit as an example, FIG. 2 shows an exemplary structural schematic diagram of the second controller 50 serving as the hardware control circuit 200 according to the present disclosure.

As shown in FIG. 2, the hardware control circuit 200 may include a switch driver 211 and a switch circuit 220, wherein the switch driver 211 is configured to receive the continuous pulse signal 311 (or 311') and convert the continuous pulse signal 311 into a switch control signal 312. The switch circuit 220 is connected to the switch driver 211 and the coil driver 60 and is configured to generate the second breaking control signal 333 or the second turn-on control signal 323 based on the switch control signal 312.

In some embodiments, the switch circuit 220 may, for example, include a resistor 222 and a switch element 221 connected in series with each other, wherein one end of the switch element 221 is grounded, and a node 223 between the resistor 222 and the switch element 221 connected in series is connected to the coil driver 60. One end of the resistor 222 is connected to the switch element 221, and the other end is connected to a high level such as 3.3V. The implementation of the hardware control circuit in the above manner may facilitate implementing the control of the coil driver 60 by the hardware control circuit 200.

In some embodiments, the hardware control circuit 200 may further include a filter circuit 215 comprising a parallel arrangement of a capacitor 216 and a resistor 217, wherein the filter circuit 215 is connected to the output of the switch driver 211 via a diode 218 to smooth the switch control signal 312 output by the switch driver 211.

Implementing the hardware control circuit in the above-described manner may advantageously implement the above second breaking control signal 333 or the second turn-on control signal 323 (to be discussed further later).

Figure 3:
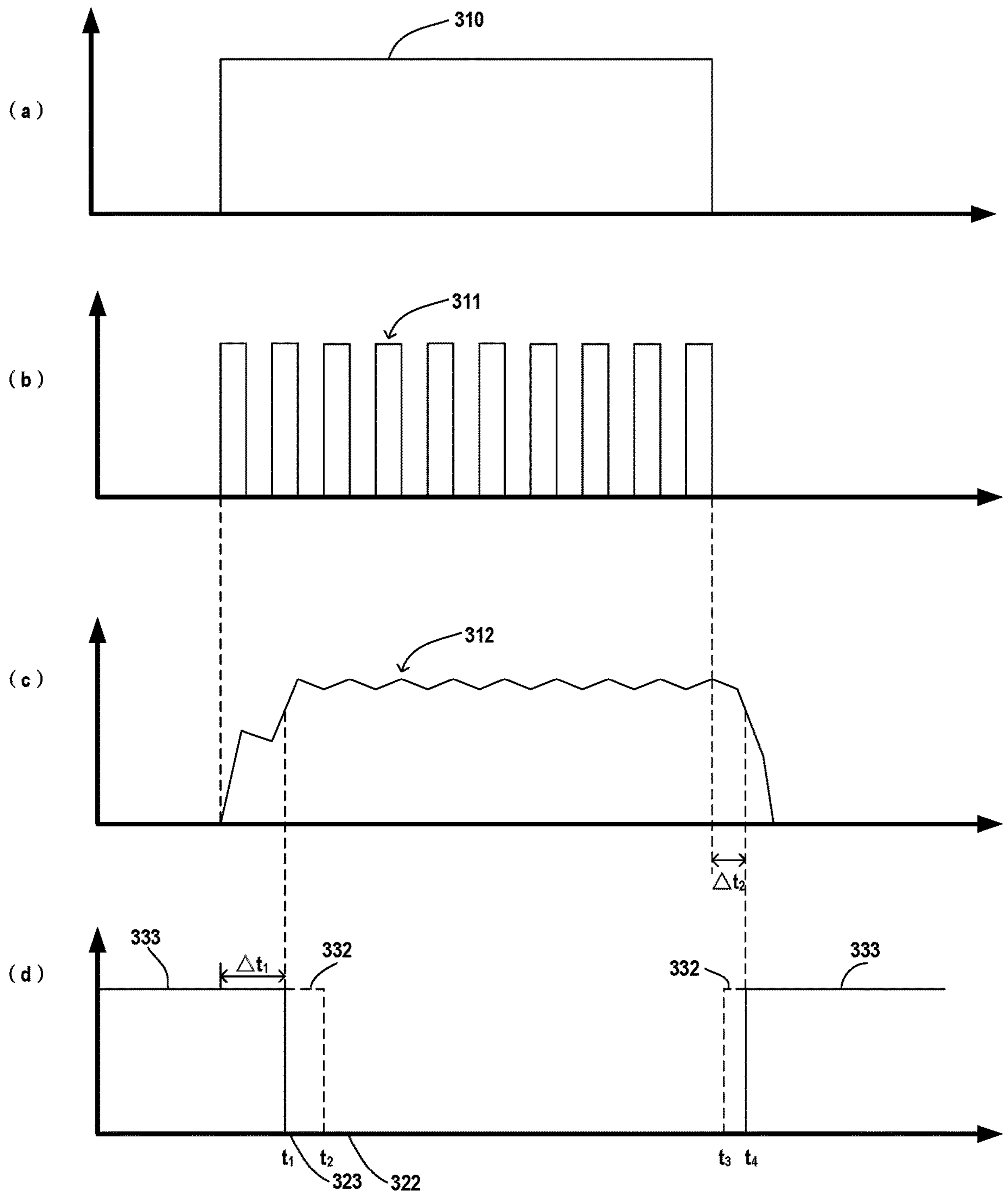
FIG. 3 shows a timing diagram of a signal of the control circuit of the contactor according to the present disclosure.

In order to more clearly describe the relationship between the signals output by the components of the contactor, FIG. 3 shows a timing diagram of the signals of the control circuit of the contactor according to the present disclosure, wherein (a) in FIG. 3 shows the turn-on control signal 310 generated by the switch control circuit 10 and instructing to turn on the contactor. The turn-on control signal 310 may be for example a high level such as 24V or 48V. When the contactor is commanded (or instructed) to turn off, the turn-on control signal 310 is cut off to a low level or 0; (b) in FIG. 3 shows that the turn-on control signal 310 is converted into the continuous pulse signal 311 by the pulse converter 20, When the contactor is commanded (or instructed) to turn off, the pulse converter 20 stops outputting the continuous pulse signal 311; (c) in FIG. 3 shows the switch control signal 312 output via the switch driver 211 in FIG. 2; and (d) in FIG. 3 shows a breaking or enable control signal output by the first controller 40 and the second controller 50 to the coil driver.

As shown in (b) and (d) of FIG. 3, the first controller 40 may generate a first breaking control signal 332 at a first time t3 in response to detection of disappearance of the continuous pulse signal 311 received from the pulse converter 20; meanwhile, the second controller 40 may generate a second breaking control signal 333 at a second time t4 in response to detection of the disappearance of the same continuous pulse signal 311 received from the pulse converter 20, wherein the first Time t3 is earlier than said second time t4. In some embodiments, a time interval Δt2 from the disappearance of the continuous pulse signal 311 to the second time t4 may for example be designed in a range of between 27 ms and 53 ms, and a time interval from the disappearance of the continuous pulse signal 311 to the first time t3 may be designed slightly shorter.

In this way, the coil driver 60 will first receive the first breaking control signal 332, and accept the control of the first breaking control signal 332, to first cut off the current of the excitation coil through the first controller 40, thereby realizing the breaking of the main contact 80 of the contactor. In a special case, in a case where the current of the excitation coil cannot be cut off according to the first breaking control signal 332, the current of the excitation coil is further cut off according to the second breaking control signal 333, thereby achieving the breaking of the main contact 80 of the contactor. This sequence of this turn-off manner is particularly advantageous when the first controller 40 is the microcontroller and the second controller 50 is the hardware control circuit, because this can preferably achieve the breaking of the contactor in a software manner, where the breaking via the software may be more convenient and efficient, and meanwhile, the second controller 50 serving as the hardware control circuit may also safely break the contactor when the software of the first controller 40 fails.

In some embodiments, the first controller 40 may also generate a first turn-on control signal 322 for the coil driver 60 at a third time t2 in response to detection of the input of the continuous pulse signal 311; at the same time, the second controller 50 may also generate a second turn-on control signal 323 for the coil driver 60 at a fourth time t1 in response to detection of the input of the continuous pulse signal 311, wherein the third time t2 is later than the fourth time t1. In some embodiments, a time interval Δt1 from the input of the continuous pulse signal 311 to the fourth time t1 may be for example designed in a range of between 1.7 ms and 4.1 ms, whereas a time interval from the input of the continuous pulse signal 311 to the second time t2 may be designed to be slightly longer.

Here, the second turn-on control signal 323 is implemented as an enable signal for the coil driver 326, and a feature or function of the enable signal is to allow the coil driver 60 to enter an enable mode, thereby allowing other signals to be input into the coil controller 6, and operating and controlling the coil driver 60 with the other signals. Thus, in these embodiments, the coil driver 60 will first receive the second turn-on control signal 323 serving as the enable signal, so that the coil driver 60 enters the enable mode. Furthermore, only in the case of the enable mode, the coil driver 60 is allowed to implement the control of the current of the excitation coil 60 via the first turn-on control signal 322.

As an example of generating the above second breaking control signal 333 serving as the breaking signal and the second turn-on control signal 323 serving as the enable signal, it can be seen with reference to FIG. 2 and (c) in FIG. 3 that the hardware control circuit 200 is designed to close the switch element 221 in the case that the switch control signal 312 becomes a high level, thereby generating the second turn-on control signal 323 as the enable signal, so that the coil controller 60 enters the enable mode, and open the switch element 221 in the case that the switch control signal 312 becomes a low level, thereby generating the second breaking control signal 333 as a breaking signal.

It will also be appreciated from the above description that in fact, from time t1 to time t4, the coil driver 60 is always in the enable mode, in which the coil driver 60 may receive current regulation and control from the first controller 40 performed in a software manner. It will be appreciated that the current needed by the excitation coil 70 is different when the contactor begins to be turned on and is in an ON state. Therefore, it is very favorable to regulate the level of the current of the excitation coil 70 via the first controller 40 in a software manner.

The principle of the control circuit of the contactor of the present disclosure has been described in detail above. The flow chart of the breaking and closing of the contactor of the present disclosure will be briefly described with reference to FIG. 4 and FIG. 5.

Figure 4:
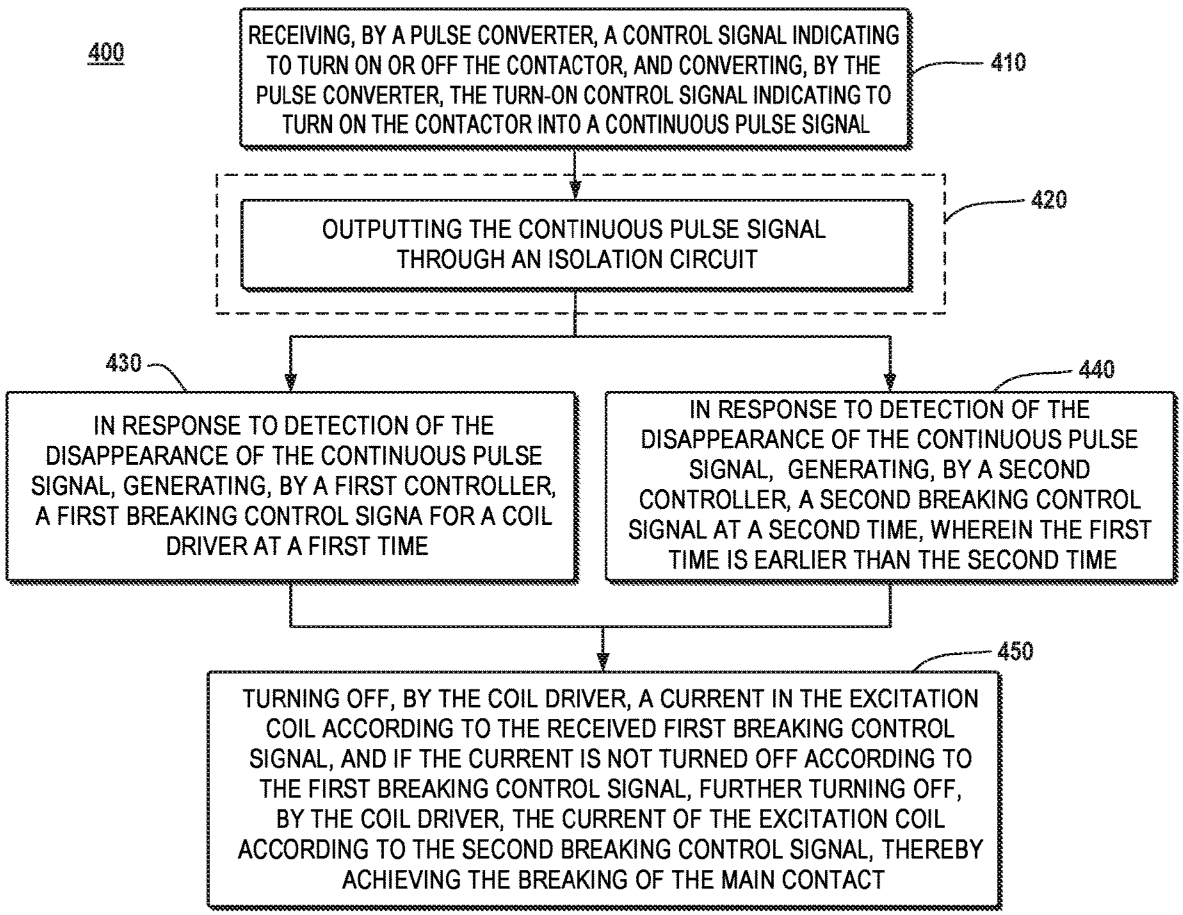
FIG. 4 shows a flow chart of the breaking of the contactor according to the present disclosure.

FIG. 4 shows a flow chart 400 of the breaking of the contactor according to the present disclosure.

As shown in FIG. 4, at block 410, receiving, by the pulse converter 20, a control signal indicating to turn on or off the contactor, and converting, by the pulse converter 20, the turn-on control signal 310 indicating to turn on the contactor into a continuous pulse signal 311. Here, in the case that the pulse converter 20 no longer receives the turn-on control signal 310 or receives a control signal indicating to turn off the contactor for example from the switch control circuit 10, the pulse converter 20 stops outputting the continuous pulse signal 311.

At optional block 420,' outputting the continuous pulse signal 311 through the isolation circuit 30, wherein the continuous pulse signal 311' may remain the same as the continuous pulse signal output by the previous pulse converter. Here, once the pulse converter 20 stops outputting the continuous pulse signal 311, the isolation circuit 30 also stops outputting the continuous pulse signal 311'. At this block, isolation circuit 30 may be used to electrically isolate the output of the pulse converter from the load end of the contactor.

At block 430, in response to detection of the disappearance of the continuous pulse signal, generating, by the first controller 40, a first breaking control signal 332 for the coil driver 60 at a first time t3.

At the same time, at block 440, in response to detection of the disappearance of the continuous pulse signal 311, generates 440, by the second controller 50, the second breaking control signal 333 at the second time t4, wherein the first time t3 is earlier than the second time. In actual processing, the operations performed by block 430 and block 440 may be processed in parallel.

Next, at block 450, turning off, by the coil driver 60, the current of the excitation coil according to the received first breaking control signal 332; and if the current is not turned off according to the first breaking control signal 332, further turning off, by the coil driver 60, the current of the excitation coil according to the second breaking control signal 333, thereby realizing the breaking of the main contact.

Figure 5:
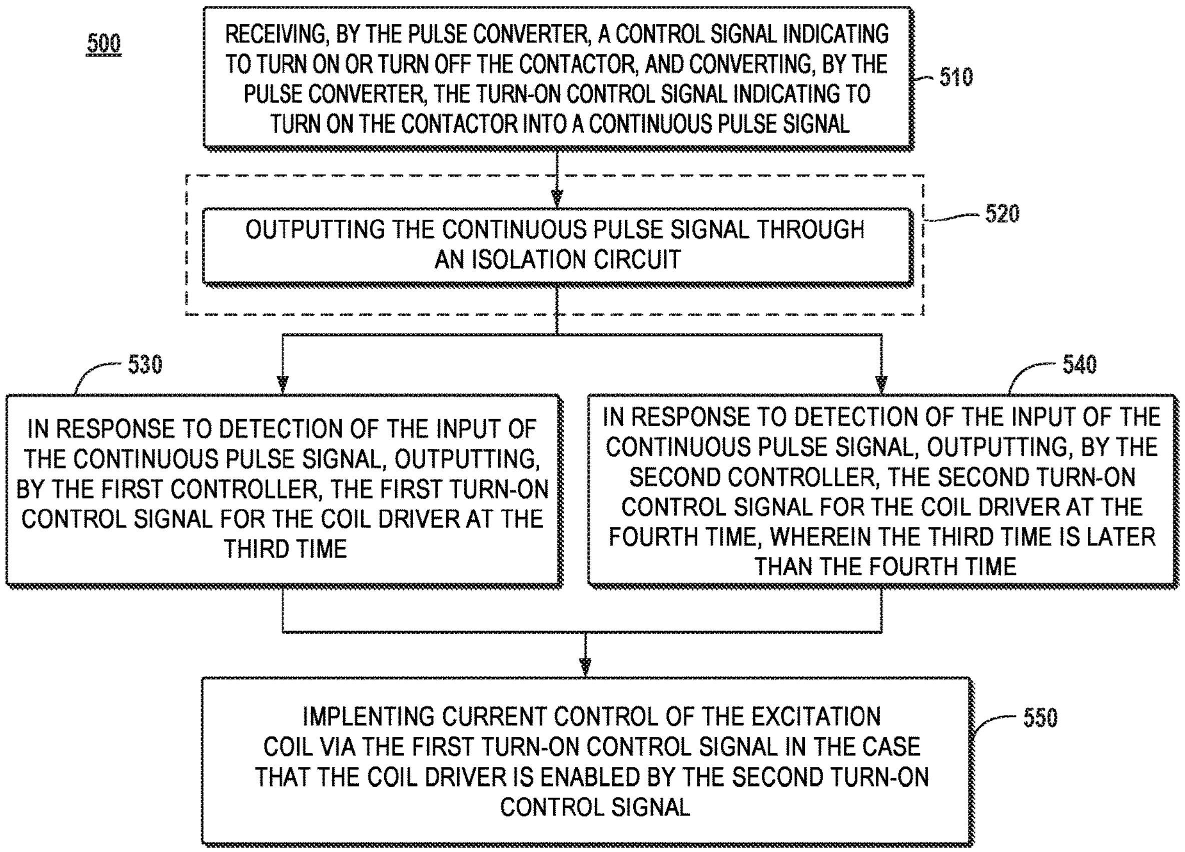
FIG. 5 shows a flow chart of the closing of the contactor according to the present disclosure.

FIG. 5 shows a flow chart 500 of the closing of the contactor according to the present disclosure.

As shown in FIG. 5, similar to block 410, at block 510, receiving, by the pulse converter 20, a control signal indicating to turn on or turn off the contactor, and converting, by the pulse converter 20, the turn-on control signal 310 indicating to turn on the contactor into a continuous pulse signal 311.

At optional block 520, outputting the continuous pulse signal 311' through the isolation circuit 30, wherein the continuous pulse signal 311' may remain the same as the continuous pulse signal output by the previous pulse converter.

At block 530, in response to detection of the input of the continuous pulse signal 311, outputting, by the first controller 40, the first turn-on control signal 322 for the coil driver at the third time t2.

Meanwhile, at block 540, in response to detection of the input of the continuous pulse signal 311, outputting, by the second controller 50, the second turn-on control signal 323 for the coil driver at the fourth time t1, wherein the second turn-on control signal 323 is an enable signal for the coil driver, and the third time t2 is later than the fourth time t1. In actual processing, the operations performed by block 530 and block 540 may be processed in parallel.

Next, at block 550, implementing current control of the excitation coil via the first turn-on control signal 322 in case that the coil driver 60 is enabled by the second turn-on control signal 323.

The flow of breaking and closing for the contactor of the present disclosure is briefly described above. It will be appreciated that the control method of the present disclosure may be applied to specific embodiments of the control circuit of the contactor described above, and the same technical effects may be obtained. Meanwhile, the operation steps described in the embodiments describing the specific structure of the control circuit may be used as steps for the control method. In addition, unless otherwise stated, the steps of the method of the present disclosure are not necessarily processed according to the indicated sequence numbers or numbers. In other embodiments, the steps of the method might be processed simultaneously, or the order of the steps may be different.

While the present invention has been illustrated and described in detail in the accompanying drawings and the foregoing description, such illustration and description are to be considered illustrative or exemplary and not restrictive; the present invention is not limited to the disclosed embodiments. Other variations to the disclosed embodiments may be understood and practiced by those skilled in the art by studying the figures, the disclosure and the appended claims upon practicing the claimed invention.

In the claims, the word "comprise" does not exclude other elements, and indefinite articles "a" and "an" do not exclude a plurality. A single element or other unit may fulfill the functions of several items recited in the claims. The mere fact that certain features are recited in mutually different dependent claims or described in different embodiments does not indicate that a combination of these features cannot be used to advantage. The protection scope of the present application covers any possible combination of various features recited in the embodiments or dependent claims without departing from the spirit and scope of the present application.

Any reference signs in the claims should not be construed as limiting the scope of the invention.

We claim:

1. A control circuit for a contactor, wherein the contactor comprises an excitation coil and a main contact coupled to the excitation coil, the control circuit comprising:

a pulse converter configured to convert a received turn-on control signal indicating to turn on the contactor into a continuous pulse signal;

a first controller connected to the pulse converter and configured to generate a first breaking control signal at a first time in response to detection of the disappearance of the continuous pulse signal received from the pulse converter;

a second controller connected to the pulse converter and in parallel with the first controller, the second controller being configured to generate a second breaking control signal at a second time in response to detection of the disappearance of the continuous pulse signal received from the pulse converter, wherein the first time is earlier than the second time; and a coil driver connected to the first controller, the second controller and the excitation coil, and configured to turn off a current of the excitation coil according to the received first breaking control signal, and if the current is not turned off according to the first breaking control signal, to further turn off the current of the excitation coil according to the second breaking control signal, thereby realizing the breaking of the main contact.

2. The control circuit according to claim 1, wherein:

the first controller comprises a microcontroller that provides the first breaking control signal to the coil driver through software embedded therein;

the second controller comprises a hardware control circuit which provides the second breaking control signal to the coil driver through a physical electrical element.

3. The control circuit according to claim 2, wherein:

the first controller is further configured to generate a first turn-on control signal for the coil driver at a third time in response to detection of the input of the continuous pulse signal, the second controller is further configured to generate a second turn-on control signal for the coil driver at a fourth time in response to detection of the input of the continuous pulse signal, wherein the second turn-on control signal is an enable signal for the coil driver, and the third time is later than the fourth time;

the coil driver is further configured to be allowed to implement current control of the excitation coil via the first turn-on control signal only in the case that the coil driver is enabled by the second turn-on control signal.

4. The control circuit according to claim 2, wherein the hardware control circuit comprises:

a switch driver configured to receive the continuous pulse signal and convert the continuous pulse signal into a switch control signal; and a switch circuit connected to the switch driver and the coil driver, and configured to generate the second breaking control signal or a second turn-on control signal based on the switch control signal.

5. The control circuit according to claim 4, wherein the switch circuit comprises a resistor and a switch element connected in series with each other, one end of the switch element is grounded, and a node between the resistor and the switch element connected in series is connected to the coil driver.

6. The control circuit according to claim 5, wherein the hardware control circuit further comprises a filter circuit connected to the output of the switch driver.

7. The control circuit according to claim 1, wherein the control circuit further comprises an isolation circuit disposed between the pulse converter and an in-parallel arrangement of the first controller and second controller to isolate the output of the pulse converter from a load end of the contactor, and configured to transmit the continuous pulse signal to both the first controller and second controller.

8. The control circuit according to claim 1, wherein the control circuit further comprises a switch control circuit for the contactor, the switch control circuit being configured to:

in response to a user's switching-on operation, generate a turn-on control signal indicating to turn on the contactor, wherein the turn-on control signal is represented by a high level; and in response to a user's switching-off operation, stop generating any signal to the pulse converter.

9. The control circuit according to claim 8, wherein the pulse converter stops outputting the continuous pulse signal in the case that the switch control circuit stops generating any signal to the pulse converter.

10. A contactor, comprising the control circuit according to claim 1.

11. A control method for a contactor, wherein the contactor comprises an excitation coil and a main contact coupled to the excitation coil, the control method comprising:

receiving, by a pulse converter, a control signal indicating to turn on or off the contactor, and converting, by the pulse converter, the turn-on control signal indicating to turn on the contactor into a continuous pulse signal;

in response to detection of the disappearance of the continuous pulse signal, generating, by a first controller, a first breaking control signal for a coil driver at a first time, wherein the coil driver is configured to drive the excitation coil;

in response to detection of the disappearance of the continuous pulse signal, generating, by a second controller, a second breaking control signal at a second time, wherein the first time is earlier than the second time;

turning off, by the coil driver, a current in the excitation coil according to the received first breaking control signal, and if the current is not turned off according to the first breaking control signal, further turning off, by the coil driver, the current of the excitation coil according to the second breaking control signal, thereby achieving the breaking of the main contact.

12. The control method according to claim 11, wherein the first controller comprises a microcontroller that provides the first breaking control signal to the coil driver through software embedded therein;

the second controller comprises a hardware control circuit that provides the second breaking control signal to the coil driver through a physical electrical element.

13. The control method according to claim 12, further comprising:

outputting, by the first controller, a first turn-on control signal for the coil driver at a third time, in response to detection of the input of the continuous pulse signal, outputting, by the second controller, a second turn-on control signal for the coil driver at a fourth time, in response to detection of the input of the continuous pulse signal, where the second turn-on control signal is an enable signal for the coil driver, and the third time is later than the fourth time; and implementing current control of the excitation coil via the first turn-on control signal in the case that the coil driver is enabled by the second turn-on control signal.

14. The control method according to claim 12, wherein the hardware control circuit comprises a switch driver and the switch circuit, wherein generating the second breaking control signal comprises:

converting the continuous pulse signal into a switch control signal via a switch driver; and generating the second breaking control signal via the switch circuit based on the switch control signal.

15. The control method according to claim 12, further comprising:

transmitting the continuous pulsed signal to both the first controller and the second controller via an isolation circuit.

16. The control method according to claim 12, further comprising:

in response to a user's switching-on operation, generating the turn-on control signal for indicating to turn on the contactor and outputting the turn-on control signal to the pulse converter, where the turn-on control signal is represented by a high level, and in response to a user's switching-off operation, stopping outputting any signal to the pulse converter.

17. A control circuit for a contactor, wherein the contactor comprises an excitation coil and a main contact coupled to the excitation coil, and the control circuit comprises:

a pulse converter configured to convert a received turn-on control signal indicating to turn on the contactor into a continuous pulse signal;

a controller connected to the pulse converter and configured to generate a breaking control signal in response to detection of the disappearance of the continuous pulse signal received from the pulse converter; and a coil driver connected to the controller and the excitation coil, and configured to turn off a current of the excitation coil according to the received breaking control signal, thereby achieving the breaking of the main contact.

18. The control circuit according to claim 17, wherein the controller is a hardware control circuit that provides the breaking control signal to the coil driver through a physical electrical element.

19. The control circuit according to claim 17, wherein the controller is a microcontroller that provides the breaking control signal to the coil driver through software embedded therein.

20. The control circuit according to claim 18, wherein the hardware control circuit comprises:

a switch driver configured to receive the continuous pulse signal and convert the continuous pulse signal into a switch control signal; and a switch circuit connected to the switch driver and the coil driver, and configured to generate the second breaking control signal or the second turn-on control signal based on the switch control signal.

21. The control circuit according to claim 20, wherein the switch circuit comprises a resistor and a switch element connected in series with each other, one end of the switch element is grounded, and a node between the resistor and the switch element connected in series is connected to the coil driver.

22. The control circuit according to claim 20, wherein the hardware control circuit further comprises a filter circuit connected to the output of the switch driver.

23. The control circuit according to claim 17, wherein the controller is further configured to generate a turn-on control signal for the coil driver, in response to detection of the input of the continuous pulse signal;

the coil driver is further configured to receive the turn-on control signal, and implement current control of the excitation coil according to the turn-on control signal.

24. The control circuit according to claim 17, wherein the control circuit further comprises an isolation circuit which is disposed between the pulse converter and the controller to isolate the output of the pulse converter from a load end of the contactor, and is configured to transmit the continuous pulse signal to the controller.

25. The control circuit according to claim 24, wherein the control circuit further comprises a switch control circuit for the contactor, the switch control circuit being configured to, in response to a user's switching-on operation, generate a turn-on control signal indicating to turn on the contactor, wherein the turn-on control signal is represented by a high level; and in response to the user's switching-off operation, stop generating any signal to the pulse converter.

26. The control circuit according to claim 24, wherein the pulse converter stops outputting the continuous pulse signal in the case that the switch control circuit stops generating any signal to the pulse converter.

* * * * *